Patented May 22, 1951

2,554,192

UNITED STATES PATENT OFFICE 2,554,192

HERBICIDAL COMPOSITION

Clinton E. Byer, Puente, and Frank A. Manley, Lynwood, Calif., assignors to Socony-Vacuum Oil Company, Incorporated, New York, N. Y., a corporation of New York No Drawing. Application November 1, 1947, Serial No. 783,616

6 Claims. (Cl. 71—2.3)

Our invention relates to the eradication of weeds by application of oil sprays.

It has long been known that undesirable plants can be killed by applying oils to the foliage and other exposed portions of the plants. Various petroleum fractions, particularly those of the diesel-fuel type, have been employed for the purpose. Oils are advantageous as compared with hormone-like herbicidal chemicals because they can be applied with much less danger to valuable plants in the vicinity, and they are preferable to many other known herbicides because of lack of danger to vertebrate animals and because of freedom from lasting effects on productivity of the soil.

However, the usefulness of herbicidal oil sprays has been limited by their loss of effectiveness in the presence of water. Previous attempts to apply oils in the form of aqueous emulsions or suspensions have yielded poor results, apparently because so few of the dispersed oil particles are able to make effective contact with the plant surfaces while water is present. Before the oil can be deposited by evaporation of water most of the emulsion drains away, either dripping to the ground or becoming concentrated on small areas, such as the ends of drooping leaves, which are not vital to the plant. It follows that the quantity of oil deposited on vital portions of the plant is insufficient to effect control.

Because of the failure of aqueous suspensions of oil it has been the general practice to use straight oils in herbicidal sprays. But, with any practicable method of spraying, it has been necessary to apply an undiluted oil generously to obtain adequate coverage, even though a smaller amount of oil, properly distributed, would suffice to kill the weeds. Consequently, the application of herbicidal oils has often been unduly costly and there has sometimes been a tendency to use such excessive amounts of oil as to undesirably prolong effects on soil productivity.

We have found that the new herbicidal composition herein disclosed yields remarkably good results when applied in the form of an aqueous suspension. We are therefore able to eradicate weeds more economically than has heretofore been possible and with less danger to valuable plants and animals and to the soil. The dosage of oil can be accurately regulated in accordance with the requirements of the area to be treated, without sacrificing uniformity of coverage. Furthermore, we are able to kill weeds efficiently at times when they are wet with water; previously it has been necessary to wait for the plants to dry before applying a herbicidal oil.

In its preferred form, our composition consists of one part by volume of the particular oil described hereinafter, 0.15% to 0.30% by weight, with respect to the oil, of 1-hydroxyethyl 2-heptadecenyl glyoxalidine, and one to six parts by volume of water, depending on the predominant species and degree of maturity of the weeds to be killed.

We have also obtained good results when the proportion of 1-hydroxyethyl 2-heptadecenyl glyoxalidine falls anywhere in the range 0.05% to 0.4%, and we have successfully substituted numerous other cationic surface-active agents, such as dodecyl amine acetate or hydrochloride, dilauryl dimethyl ammonium bromide, and cetyl dimethyl benzyl ammonium chloride. With the alternative agents, the permissible range of proportions varies somewhat, the minimum often being as much as 0.1% and the maximum running as high as 1.0%, particularly in the cases of agents in which the lipophilic hydrocarbon chain is not more than twelve carbon atoms in length. In all cases, however, we have found the optimum proportion to fall in or very near to the range 0.15% to 0.30%.

The oil employed is a highly aromatic liquid obtained as the bottom fraction in the distillation of the product resulting from thermally cracking a gas oil having an original boiling range of approximately 450° F. to 700° F., the gas oil itself being a distillate fraction obtained as one of the products of a catalytic cracking process. The characteristics of the oil vary in accordance with the cracking conditions, the nature of the original petroleum, etc. The following two samples are exemplary of the material:

| | Sample A | Sample B |
|---|---|---|
| Color (Union) | Black | Black |
| Gravity (A. P. I.) degrees | 13.4 | 6.8 |
| Aniline Cloud Point (Mixed) °F | 90.5 | 70.0 |
| Viscosity (S. U. at 100° F.) sec | 50.0 | 72.0 |
| A. S. T. M. Distillation: | | |
| Initial °F | 452 | 456 |
| 10% °F | 507 | 522 |
| 50% °F | 560 | 590 |
| 88% °F | [1] 680 | |
| 90% °F | | [1] 710 |
| Bromine Number | 34.7 | 26.2 |
| Aromatics and Unsaturates per cent | 83.0 | 99 |
| Acid Heat °F | 37.0 | |

[1] Distillation terminated due to cracking.

While this oil is a petroleum product, it cannot be regarded as a petroleum fraction. Virtually all of its molecules are new molecules formed in the cracking processes, having little resemblance to the alkanes and cycloalkanes of the original petroleum. Corresponding products from other cracking processes may be used when they have similar characteristics as to gravity, aromaticity, volatility, and viscosity.

In general, the oil should have an A. P. I. gravity between 2° and 16°, and sufficient aromaticity to yield a mixed aniline cloud point less than 100° F. The viscosity may vary widely; if the oil is a definitely mobile liquid it is satisfactory in this respect. An excessively volatile oil would not function satisfactorily in our composition, but it is unnecessary to set forth limits for the boiling range because any oil which meets the above requirements as to gravity, aromaticity, and viscosity necessarily falls well within the permissible range of volatility.

The oil is very similar to water in specific gravity. As a result, its suspensions with water are slow to separate into bodies of oil and water even when no emulsifying agent is present. But this stability or pseudo-stability is apparent only in large bodies of a suspension. The initial coalescence of dispersed oil globules into larger globules occurs as quickly with our oil as with any other oil; the difference is that the coalesced globules of our oil have so little buoyancy (positive or negative) that gravimetric concentration and separation of phases do not follow or do so very slowly.

Thus, on a small scale, as in the film of sprayed liquid clinging to a plant, aqueous suspensions of our oil act as completely unstable dispersions, while on a large scale, as in the tank of the spray apparatus, they act as fairly stable suspensions. This yields a great advantage over oils previously used as herbicides. Heretofore, in order to avoid gravimetric separation of phases in the spray tank, it has been necessary to stabilize aqueous suspensions of oil by addition of emulsifying agents. Suspensions thus stabilized, when subjected to the intense emulsifying action of the spray nozzle, become so tightly emulsified that there is no possibility of quick separation of phases on the plant surface.

Petroleum fractions of similar specific gravity cannot be used effectively in herbicidal sprays; they are very viscous, tarry substances forming globules which act almost like solid particles in suspension and in contact with plant surfaces.

The above-described oil has the additional property of very great phototoxic power, probably because of its high content of aromatics and unsaturates. This properly contributes to the ability of the oil to be used in aqueous suspension. We have ascertained under experimental conditions that, even if the difficult problem of depositing a fully unstable suspension on plant surfaces be overcome, an oil of the diesel-fuel type may not be cut back with more than one volume of water because its phytotoxic power is not sufficient to stand greater dilution. But compositions containing too little water are unsatisfactory be-because of their tendency to form suspensions of thick consistency in the tubing and nozzle of the spray device, thus impairing the efficiency of the apparatus. For this reason the one-to-one proportion is on the borderline of usefulness.

The oil employed in our composition is so highly phytotoxic that it can nearly always be applied in a suspension having three to six parts of water, which is handled very readily by spray apparatus. We find it desirable to use proportions of one or two parts of water only when treating exceptionally resistant plants, such as various xerophytes, which are nearly immune to ordinary oils.

A secondary advantage of our oil is its dark color, which gives an immediate and easily visible indication of what areas have been covered with the spray. The lack of such an index has contributed considerably to the excessive application of oils in the past, as operators frequently spray the same area twice to be sure that nothing is missed.

Although the above-described oil is uniquely suited for herbicidal use in aqueous suspension, we have found that it fails unless the composition includes a small proportion of a cationic surface-active agent. Substances of that kind have been employed in spray compositions heretofore, in greater amounts, as wetting agents, spreading agents, and emulsifiers. But in our composition the cationic agent is present in proportions too small to function in such manners; in fact, it is extremely important that the agent be used in amount insufficient to have an appreciable effect on interfacial tension, otherwise the suspension is given such stability as to destroy its utility.

It is our belief that the added cationic agent functions only to reverse the normal tendency of an oil to assume a negative electrical charge at its interface with water. It appears that plants, or at least the herbaceous portions of vascular plants, carry a considerable negative charge at the surface. The repulsion between the plant surface and the normally negatively charged oil globules tends to maintain the oil in suspension or to cause it to separate out on the outer surface of the layer of water adhering to the plant. When the oil-in-water suspension contains a cationic surface-active agent, the oil becomes positively charged and tends to separate out on the inner surface of the water layer, in intimate contact with the plant.

A similar amount of an anionic agent is worse than no agent at all, as it augments the normal negative charge of the oil. A surface-active agent of the nonionic type or the mixed type has no effect unless used in sufficient quantity to affect the stability of the suspension, in which case it is disadvantageous.

So far as we have been able to determine, any definitely cationic surface-active agent will function in our composition, although some agents, especially the above-mentioned 1-hydroxyethyl 2-heptadecenyl glyoxalidine and its near relatives, yield materially better results than others. Either oil-soluble agents or water-soluble agents may be used, the oil-soluble agents being somewhat preferable.

The exact optimum proportion of agent varies from one batch of oil to the next in a manner which we have been unable to correlate with other properties of the oil. While any proportion of agent within the limits set forth above yields good results, we recommend that each tankful of oil be tested to determine the true optimum. Complete field tests are not needed for this purpose, since the color of the oil provides a visible indication of which samples of the composition yield the best oil deposit.

Because of the extreme importance of avoiding excessive proportions of the cationic agent and because of the desirability of maintaining laboratory control, it is preferable that the agent be added to the oil by the manufacturer. The water is, of course, more conveniently added to the composition in the field by operator; therefore, during storage, shipment, etc., the herbicidal composition consists of the oil and the agent.

The herbicidal spray composition is applied by conventional weed-spraying apparatus, preferably at pressures of 60 to 100 pounds per square inch. The amount of spray liquid to be applied per unit of ground area depends on the size and concentration of the weeds; in general, the expenditure of total spray liquid may be expected to be at a rate of from 50 to 600 gallons per acre.

We claim as our invention:

1. A herbicidal spray composition comprising: one part by volume of a liquid cracking product of petroleum characterized by gravity between 2° and 16° A. P. I. and mixed aniline cloud point less than 100° F., one to six parts by volume of water, and a cationic surface-active agent in amount insufficient to stabilize the suspension of said oil in said water.

2. A herbicidal spray composition comprising: one part by volume of a liquid cracking product of petroleum characterized by gravity between 2° and 16° A. P. I. and mixed aniline cloud point less than 100° F., one to six parts by volume of water, and 0.05% to 0.4% by weight with respect to the oil of 1-hydroxyethyl 2-heptadecenyl glyoxalidine.

3. A herbicidal spray composition comprising: one part by volume of a liquid cracking product of petroleum characterized by gravity between 2° and 16° A. P. I. and mixed aniline cloud point less than 100° F., one to six parts by volume of water, and 0.15% to 0.3% by weight (with respect to the oil) of a cationic surface-active agent.

4. A herbicidal oil composition comprising: a liquid cracking product of petroleum characterized by gravity between 2° and 16° A. P. I. and mixed aniline cloud point less than 100° F., and a cationic surface-active agent in amount insufficient to stabilize suspensions of said liquid in water.

5. A herbicidal oil composition comprising: a liquid cracking product of petroleum characterized by gravity between 2° and 16° A. P. I. and mixed aniline cloud point less than 100° F., and 0.05% to 0.4% by weight of 1-hydroxyethyl 2-heptadecenyl glyoxalidine.

6. A herbicidal oil composition comprising: a liquid cracking product of petroleum characterized by gravity between 2° and 16° A. P. I. and mixed aniline cloud point less than 100° F., and 0.15% to 0.3% by weight of a cationic surface-active agent.

CLINTON E. BYER.
FRANK A. MANLEY.

REFERENCES CITED

The following references are of record in the file of this patent:

UNITED STATES PATENTS

| Number | Name | Date |
|---|---|---|
| 1,914,902 | Volck | June 20, 1933 |
| 2,015,043 | Stratford | Sept. 17, 1935 |
| 2,079,827 | Volck | May 11, 1937 |
| 2,160,929 | Warner | June 6, 1939 |
| 2,214,152 | Wilkes | Sept. 10, 1940 |
| 2,418,652 | Maxwell | Apr. 8, 1947 |
| 2,447,445 | Kaberg | Aug. 17, 1948 |

FOREIGN PATENTS

| Number | Country | Date |
|---|---|---|
| 647,104 | France | July 24, 1928 |

OTHER REFERENCES

"Insecticides, Fungicides and Weed-Killers" by E. Bourcart, 2nd. English ed. by T. R. Burton—published in London (1925) by Scott, Greenwood and Son. Pages 307, 308, 313, 314.